United States Patent [19]

Matsuda et al.

[11] Patent Number: 4,861,624
[45] Date of Patent: Aug. 29, 1989

[54] METHOD OF MANUFACTURING A CYLINDRICAL CAPACITOR

[75] Inventors: Shuzou Matsuda; Satoomi Naitou; Takahiro Wakano, all of Nagaokakyo, Japan

[73] Assignee: Murata Manufacturing Co., Ltd., Japan

[21] Appl. No.: 88,884

[22] Filed: Aug. 24, 1987

[30] Foreign Application Priority Data

Aug. 29, 1986 [JP] Japan ................... 61-204270
Aug. 29, 1986 [JP] Japan ................... 61-204271

[51] Int. Cl.⁴ .................... B05D 5/12; H01G 4/28
[52] U.S. Cl. .................... 427/81; 29/25.42; 427/79; 427/230; 427/238
[58] Field of Search .......... 29/25.42; 361/307, 321 C; 427/79, 81, 238, 230

[56] References Cited

U.S. PATENT DOCUMENTS

| | | | |
|---|---|---|---|
| 2,067,922 | 1/1937 | Hothersall | 427/238 X |
| 2,451,158 | 10/1948 | Donovan | 427/238 |
| 2,793,333 | 5/1957 | Ehlers | 361/321 C |

FOREIGN PATENT DOCUMENTS 126559  1/1948  United Kingdom ............... 361/307

Primary Examiner—Carl E. Hall
Attorney, Agent, or Firm—Ostrolenk, Faber, Gerb & Soffen

[57] ABSTRACT

An end surface (5, 5b) of a cylindrical ceramic body (2, 2b) is dipped into a bath of metal paste (15), so that an opening (10, 10b) formed in the end surface is closed by the metal paste. Then an air pressure difference is provided such that the air pressure in an inner space (9, 9b) of the ceramic body is lower than the air pressure in an outer space (19, 19b) surrounding the ceramic body, whereby the surface of the metal paste located in the inner space is upwardly moved. Thus, a substantial region of an inner peripheral surface (7, 7b) of the ceramic body is brought into contact with the metal paste. Then the pressure difference is cancelled so that a metal paste film (21, 21a, 21b) for serving as an inner electrode (3, 3a, 3b) of a cylindrical capacitor (1, 1a, 1b, 1c) is formed on the inner peripheral surface.

18 Claims, 7 Drawing Sheets

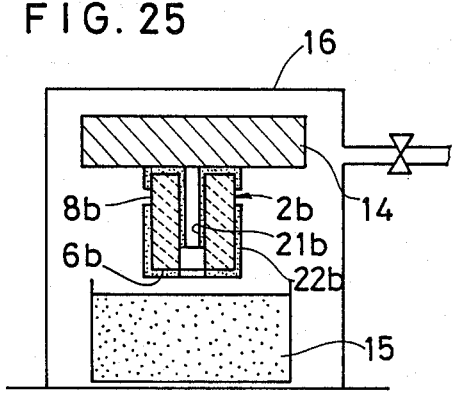
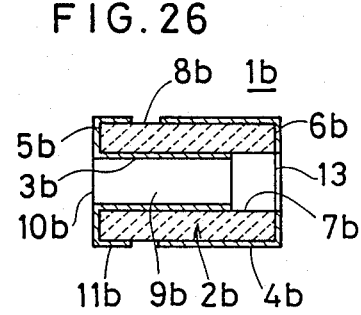
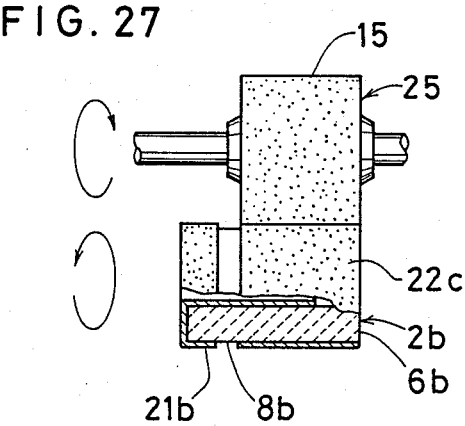
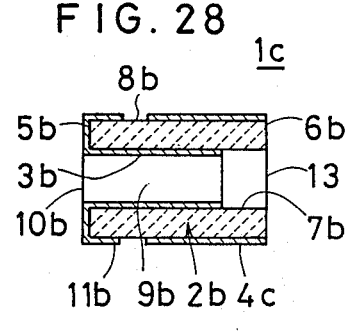

METHOD OF MANUFACTURING A CYLINDRICAL CAPACITOR

BACKGROUND OF THE INVENTION

1. Field of the Invention

The present invention relates to a method of manufacturing a cylindrical capacitor having a cylindrical ceramic body serving as a dielectric member, and more particularly, it relates to an improvement in a method of forming an inner electrode provided on the inner peripheral surface of the cylindrical ceramic body.

2. Description of the Prior Art

In general, a cylindrical capacitor is provided with a cylindrical ceramic body in order to attain a prescribed capacitance through an inner electrode and an outer electrode which are provided on inner and outer peripheral surfaces of the ceramic body respectively in an opposite manner. Various types of such cylindrical capacitors are provided by various methods of forming the inner and outer electrodes, configurations of the ceramic bodies and the like FIGS. 9, 16, 26 and 28 are illustrative of four typical cylindrical capacitors obtained through various embodiments of the present invention. With reference to these figures, the structure of the cylindrical capacitors and a conventional method of manufacturing the same will now be described.

A cylindrical capacitor 1 as shown in FIG. 9 is provided with a cylindrical ceramic body 2, an inner electrode 3 and an outer electrode 4. The ceramic body 2 has oppositely provided first and second end surfaces 5 and 6. It also has inner and outer peripheral surfaces 7 and 8 extending between the first and second end surfaces 5 and 6 which are opposite to each other. The ceramic body 2 further has an opening 10 which communicates with an inner space 9 enclosed by the inner peripheral surface 7 only at the first end surface 5

The inner electrode 3 is formed to extend from the inner peripheral surface 7 of the ceramic body 2 to a part of the outer peripheral surface 8, across through the first end surface 5, for electrical connection with the exterior, thereby to define a terminal electrode part 11 on the outer peripheral surface 8.

The outer electrode 4 is formed on the outer peripheral surface 8 of the ceramic body 2 to be opposite to the inner electrode 3, separated by the ceramic body 2. This outer electrode 4 is adapted to extend onto the second end surface 6 of the ceramic body 2.

A cylindrical capacitor 1a as shown in FIG. 16 has many elements which are substantially identical in structure to the cylindrical capacitor 1 as shown in FIG. 9. Therefore, corresponding components are indicated by the same reference numerals to avoid redundant description.

The cylindrical capacitor 1a as shown in FIG. 16 is different from the cylindrical capacitor 1 in FIG. 9 in that the inner electrode 3a thereof extends all the way to a bottom surface 12 of an inner space 9 of a ceramic body 2 and covers the same.

A cylindrical capacitor 1b as shown in FIG. 26 is different from the foregoing capacitors in that the configuration of a ceramic body 2b is different from the respective ceramic bodies in the cylindrical capacitors 1 and 1a as shown in FIGS. 9 and 16. The ceramic body 2b is provided with a first opening 10b which communicates with an inner space 9b at a first end surface 5b, as well as a second opening 13 which communicates with the inner space 9b at a second end surface 6b.

An inner electrode 3b extends from an inner peripheral surface 7b of the ceramic body 2b to an outer peripheral surface 8b across the first end surface 5b, to form a terminal electrode part 11b on the outer peripheral surface 8b.

On the other hand, an outer electrode 4b extends from the outer peripheral surface 8b of the ceramic body 2b to the second end surface 6b.

A cylindrical capacitor 1c as shown in FIG. 28 has several elements which are substantially identical in structure to the cylindrical capacitor 1b as shown in FIG. 26. Therefore, components corresponding to those of FIG. 26 are indicated by the same reference numerals, to avoid redundant description.

The cylindrical capacitor 1c as shown in FIG. 28 is different from the cylindrical capacitor 1b of FIG. 26 in that the outer electrode 4c is formed not to extend over a second end surface 6b of a ceramic body 2b.

Generally, in order to form the inner electrode 3, 3a or 3b and the outer electrode 4, 4b or 4c of the aforementioned cylindrical capacitor 1, 1a, 1b, or 1c, metal paste containing metal such as silver or silver-palladium for forming these electrodes is coated to form metal paste films, which are then subjected to baking. In such a method, the step of coating the metal paste on the outer surface of the capacitor can be relatively easily performed by utilizing a transfer roller, a brush or a knife with respect to the terminal electrode part 11 or 11b of the inner electrode 3, 3a or 3b, and the outer electrode 4, 4b or 4c, which are provided on the outwardly directed surface of the ceramic body 2 or 2b or parts thereof. However, it is rather difficult to form a metal paste film for providing a part of the inner electrode 3, 3a or 3b positioned on the inner peripheral surface 7 or 7b.

In general, such a metal paste film for providing the part of the inner electrode 3, 3a or 3b to be positioned on the inner peripheral surface 7 or 7b has been formed by inserting a rotating pin with metal paste applied thereon, into the inner space 9 or 9b of the ceramic body 2 or 2b.

However, such a method of coating metal paste through a rotating pin has the following disadvantages:

(1) It is difficult to form a metal paste film of uniform thickness on the inner peripheral surface of a ceramic body.

(2) In the inner electrode 3 or 3b as shown in FIG. 9, 26 or 28 whose edge is located on the inner peripheral surface 7 or 7b, the edge may be provided in a corrugated state. Further, it is difficult to always provide such an edge in a constant position in the axial direction of the ceramic body. Thus, the surface areas of such inner electrodes may vary from product to product.

(3) In case of the inner electrode 3a as shown in FIG. 16 which extends toward and across the bottom surface 12 of the ceramic body 2, it is difficult to coat the metal paste by means of a rotating pin, particularly at the internal angles at which the inner peripheral surface 7 and the bottom surface 12 intersect with each other. Thus, a part of a metal paste film formed on the bottom surface 12 may be isolated from that formed on the inner peripheral surface 7.

(4) When the ceramic body is changed in inner diameter, the rotating pin must be replaced by another pin having a corresponding outer diameter, whereby it takes time for the replacement and following adjustment of the position for mounting the rotating pin, and this increases the required manufacturing time.

(5) It is extremely difficult to coat metal paste on the inner peripheral surfaces of a large number of ceramic bodies at the same time by means of rotating pins, and hence high productivity cannot be expected.

(6) Metal paste cannot be applied by a rotating pin to a ceramic body having an inner peripheral surface having a non-circular cross-sectional configuration but rather having, e.g., a rectangular cross-sectional configuration.

SUMMARY OF THE INVENTION

Accordingly, an object of the present invention is to provide a method of manufacturing a cylindrical capacitor and more, particularly a method of forming an inner electrode which can overcome the aforementioned disadvantages of the prior art.

A cylindrical capacitor which is manufactured by the inventive method comprises a cylindrical ceramic body which has opposite first and second end surfaces and an inner peripheral surface and an outer peripheral surface extending between the first and second end surface in an opposite manner as well as an opening communicating with an inner space enclosed by the inner peripheral surface at the first end surface and inner and outer electrodes respectively formed on the inner and outer peripheral surfaces to be opposite to each other. In order to form the inner electrode of such a cylindrical capacitor, the present invention comprises:

(1) a step of preparing the cylindrical ceramic body, (2) a step of preparing a bath of metal paste containing metal for forming the inner electrode, (3) a step of closing the opening by the metal paste by bringing the first end surface of the ceramic body into at least contact with the surface of the metal paste bath, (4) a step of causing such an air pressure difference that the air pressure in the inner space of the ceramic body whose opening is closed by the metal paste is lower than the air pressure in an outer space defined in the exterior of the outer peripheral surface of the ceramic body, (5) a step of making the surface of the metal paste part located in the inner space higher than the surface of the metal paste part located in the outer space in response to the pressure difference thereby to selectively bring the metal paste into contact with a substantial region of the inner peripheral surface, and (6) a step of cancelling the pressure difference to form a film of the metal paste for serving as the inner electrode in the substantial region of the inner peripheral surface.

According to the present invention, the metal paste is upwardly urged from the opening of the ceramic body into the inner space by the pressure difference caused between the inner space and the outer space of the ceramic body, whereby the metal paste film is formed on the inner peripheral surface to the upwardly urged position of the metal paste. Thus, the metal paste film can be formed with substantially uniform thickness, and the edge of the metal paste film located on the inner peripheral surface of the ceramic body is not corrugated in configuration.

Further, the vertical position of the upwardly urged metal paste is determined by the pressure difference between the inner space and the outer space regardless of the inner diameter of the ceramic body. Therefore, the metal paste film can be formed up to a constant level of the inner peripheral surface by regulating the pressure difference, with no regard to the size of the inner diameter of the ceramic body. Thus, areas of inner electrodes do not vary from product to product, while no complicated operation is required to replace a rotating pin every time the ceramic body is changed in inner diameter or axial length as hereinabove described with reference to the prior art. Further, the area of the metal paste film formed on the inner peripheral surface of the ceramic body can be easily increased/decreased by regulating the aforementioned pressure difference. According to the present invention, further, the metal paste film can be formed with no regard to the sectional configuration of the inner peripheral surface of the ceramic body.

In addition, the metal paste can be coated on a large number of ceramic bodies at the same time, whereby cylindrical capacitors can be manufactured with high productivity.

In the step of closing the opening of the ceramic body by the metal paste, the metal paste film for serving as a terminal electrode part of the inner electrode provided on the outer peripheral surface of the ceramic body can be simultaneously formed by controlling depth of a position in which the first end surface of the ceramic body is located in the metal paste bath.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 17 to 25 illustrate respective steps included in still another embodiment of a method according to the present invention;

FIG. 26 is a sectional view showing a cylindrical capacitor obtained through the steps as shown in FIGS. 17 to 25;

FIG. 27 illustrates a modification of a method of forming an outer electrode; and FIG. 28 is a sectional view showing a cylindrical capacitor obtained by applying the method of forming an outer electrode as shown in FIG. 27.

DESCRIPTION OF THE PREFERRED EMBODIMENTS

Figure 9:
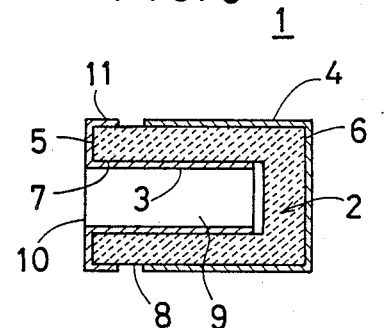
FIG. 9 is a sectional view showing a cylindrical capacitor obtained through the steps as shown in FIGS. 1 to 8.

Referring to FIGS. 1 to 8, a method of manufacturing the cylindrical capacitor 1 as shown in FIG. 9 will now be described. As mentioned above, the cylindrical capacitor 1 is provided with the cylindrical ceramic body 2 having the opposite first and second end surfaces 5 and 6 and the inner and outer peripheral surfaces 7 and 8 extending between the first and second end surfaces 5 and 6 in an opposite manner, as well as the opening 10 which communicates with the inner space 9 enclosed by the inner peripheral surface 7 at the first end surface 5. The inner and outer electrodes 3 and 4 are provided on the inner and outer peripheral surfaces 7 and 8 of the ceramic body 2 to be opposite to each other. The inner electrode 3 has the terminal electrode part 11 extending onto outer peripheral surface 8.

Figure 1:
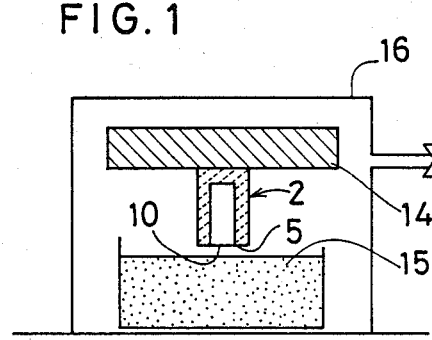
FIGS. 1 to 8 illustrate respective steps included in an embodiment of a method according to the present invention in sequence.

In order to manufacture such a cylindrical capacitor 1, the ceramic body 2 is first prepared as shown in FIG. 1. The ceramic body 2 is held by a holding plate 14 with the opening 10 being directed downwardly. The holding plate 14 holds the ceramic body 2 by means of a pressure sensitive adhesive or a pressure sensitive adhesive double coated sheet (not shown). A bath of metal paste 15 containing metal such as silver or silver-palladium for forming the inner electrode 3 is provided under the ceramic body 2. The ceramic body 2, the holding plate 14 and the bath of the metal paste 15 are placed in a pressure-regulatable treatment vessel 16.

Then the treatment vessel 16 is evacuated as shown by an arrow 17 by a vacuum pump (not shown) or the like to be decompressed to a prescribed pressure level, while the first end surface 5 of the ceramic body 2 is out of contact with the surface of the bath of the metal paste 15. The said pressure level is lower than the atmospheric pressure as a matter of course, and is preferably selected to be higher than 50 mmHg, and more preferably, higher than 70 mmHg, for the following reason: When the air pressure in the treatment vessel 16 approaches a vacuum without limit, a solvent in the metal paste 15 will be extremely volatized, and this will dry the surface of the metal paste 15, whereby the wettability of the ceramic body 2 and the metal paste 15 will be decreased. Further, air voids contained in the metal paste 15, which cannot be removed under the atmospheric pressure, expand greatly in a vacuum state and deteriorate the smoothness of the surface of the bath of the metal paste 15. Therefore, the edge of the metal paste film which forms the terminal electrode part 11 is hereinafter described may have an irregular configuration.

Although a large number of ceramic bodies 2 are held by the holding plate 14 in practice, only one such ceramic body 2 is shown in FIGS. 1 to 8 for convenience of illustration.

Figure 2:
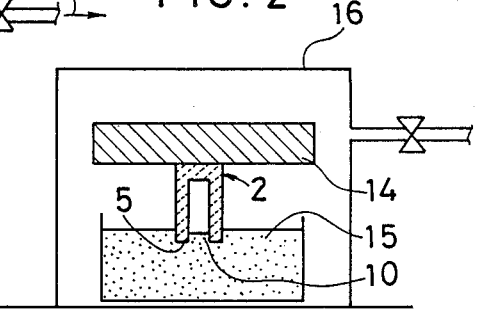

When the treatment vessel 16 is completely decompressed, the ceramic body 2 is such that the first end surface 5 thereof is at least in contact with the surface of the bath of the metal paste 15, as shown in FIG. 2. According to this embodiment, an end of the ceramic body 2 is dipped into the metal paste 15 so that the first end surface 5 thereof is located at a prescribed depth in the bath of the metal paste 15. The depth to which the ceramic body 2 is dipped into the bath is so adjusted as to obtain the required length for the terminal electrode part 11 as shown in FIG. 9.

Figure 3:
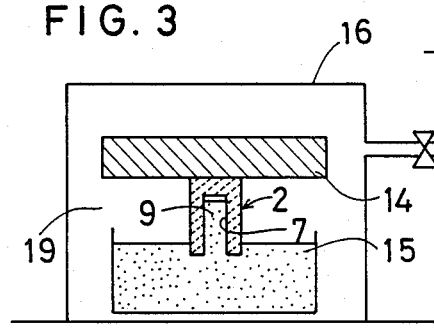

Then, outside air is introduced into the treatment vessel 16 as shown by an arrow 18 in FIG. 3, to restore the pressure condition in the treatment vessel 16 to the atmospheric pressure level. Thus, such an air pressure difference is caused that the air pressure in the inner space 9 enclosed by the inner peripheral surface 7 of the ceramic body 2 is lower than the air pressure in the outer space 19 defined by the exterior of the outer peripheral surface 8. In response to such air pressure difference, the surface of the metal paste 15 located in the inner space 9 rises above the surface of the metal paste 15 located in the outer space 19, whereby the metal paste 15 is selectively brought into contact with a substantial region of the inner peripheral surface 7 of the ceramic body 2 (FIG. 3).

Figure 4:
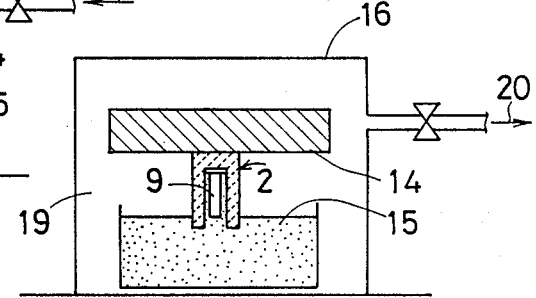

Then, the treatment vessel 16 is again decompressed as shown by an arrow 20 in FIG. 4. Thus, the pressure in the outer space 19 is substantially identical to or slightly lower than that in the inner space 9, whereby all excess metal paste 15 upwardly urged in the inner space 9 is extracted. This step may be performed while lifting the ceramic body 2 out of the metal paste 15.

Figure 5:
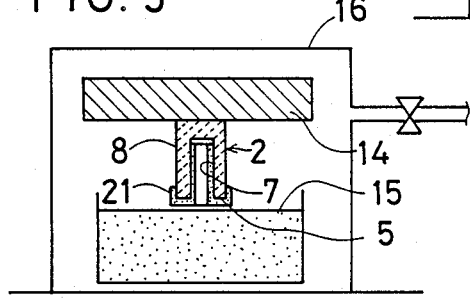

Then, the ceramic body 2 is lifted up from the bath of the metal paste 15 as shown in FIG. 5, whereby a metal paste film 21 is formed to serially extend along the inner peripheral surface 7, the first end surface 5 and a part of the outer peripheral surface 8 of the ceramic body 2.

The metal paste 15 is uniformly adhered in sufficient volume onto the inner peripheral surface 7 of the ceramic body 2 through the aforementioned series of operations whereby the metal paste film 21 is with necessary, sufficient and uniform thickness. Further, the surface level of the metal paste 15 in the inner space 9 may be fixed by regulating the pressure difference between the inner space 9 and the outer space 19 in the step as shown in FIG. 3. In addition, the surface of the metal paste 15 in the inner space 9 is maintained smooth in the step of FIG. 3. Thus, the metal paste film 21 can be given a surface.

The second decompression as shown in FIG. 4 is necessary when the part of the metal paste 15 located in the inner space 9 is not naturally discharged by gravity in the step of FIG. 5, on the other hand such operation is not necessarily required if the said part of the metal paste 15 in the inner space 9 is naturally discharged, in a ceramic body having a large inner diameter, for example.

Figure 6:
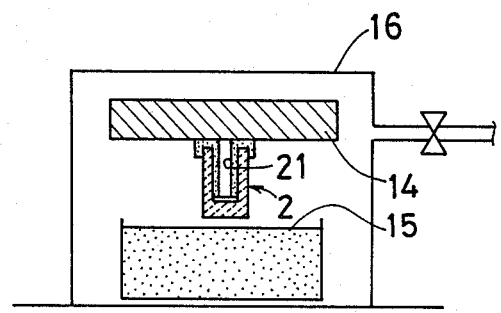

The metal paste film 21 formed as shown in FIG. 5 is dried and thereafter another metal paste film is formed to serve as the outer electrode 4 (FIG. 9). Such metal paste film for serving as the outer electrode 4 may be formed by a coating method employing a brush, a knife, a transfer roller or the like. On the other hand the following dipping method is suitable for mass production:

Referring to FIG. 6, the ceramic body 2, having been provided with the metal paste film 21 which is obtained through the step of FIG. 5, is held by the holding plate 14 in a vertically inverted manner.

Figure 7:
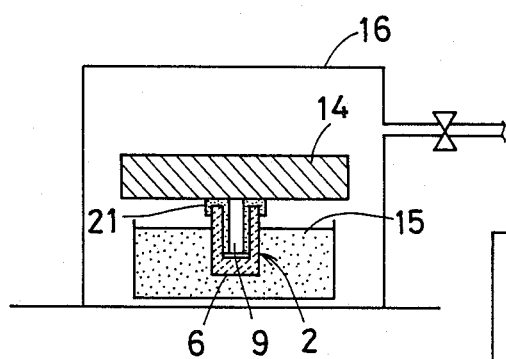
Figure 8:
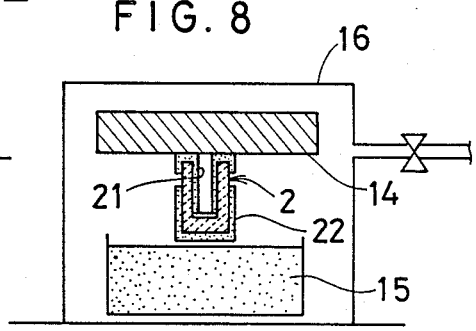

As shown in FIG. 7, the ceramic body 2 is then dipped into the bath of the metal paste 15 to a prescribed depth. The metal paste 15 will not enter the inner space 9 of the ceramic body 2 at this time since no opening is defined in the second end surface 6 of the ceramic body 2. Thus, it is not necessary to particularly change the pressure condition in the treatment vessel 16, which may be maintained at atmospheric pressure.

Then, the ceramic body 2 is lifted up from the bath of the metal paste 15, so that a metal paste film 22 is formed to serve as the outer electrode 4. After the metal paste film 22 is dried, the ceramic body 2 is removed from the holding plate 14.

Thus, the ceramic body 2 has been provided with the metal paste film 21 for serving as the inner electrode 3 and the metal paste film 22 for serving as the outer electrode 4. Then it is subjected to a step of baking the metal paste films 21 and 22. Thus, the inner electrode 3 and the outer electrode 4 as shown in FIG. 9 are respectively obtained from the metal paste films 21 and 22, to provide the desired cylindrical capacitor 1.

Figure 14:
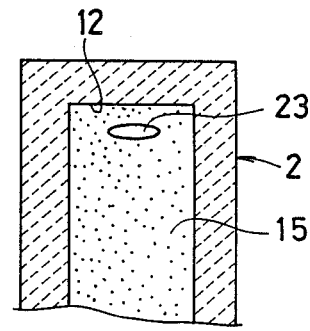
Figure 15:
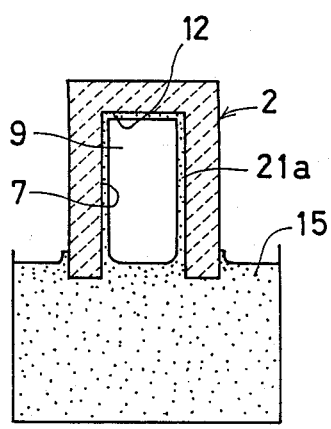
Figure 16:
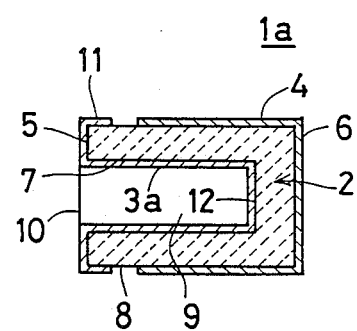
FIG. 16 is a sectional view showing a cylindrical capacitor obtained through the steps as shown in FIGS. 10 to 15.

FIGS. 10 to 15 illustrate respective steps included in another embodiment of a method according to the present invention in sequence, which embodiment is adapted to obtain the cylindrical capacitor 1a as shown in FIG. 16. As mentioned above, the cylindrical capacitor 1a is different from the cylindrical capacitor 1 of FIG. 9 in that the inner electrode 3a extends toward and across the bottom surface 12 in the inner space 9 of the ceramic body 2. In the case of the cylindrical capacitor 1a, pressure regulation steps similar to those in first embodiment are performed by using a treatment vessel which is similar to the pressure-regulatable treatment vessel 16 as shown in FIGS. 1 to 8. However, the treatment vessel is not shown in FIGS. 10 to 15. Further, this embodiment uses a holding plate corresponding to the holding plate 14 as shown in FIG. 1 to 8, but the holding plate is not shown in FIGS. 10 to 15.

Figure 10:
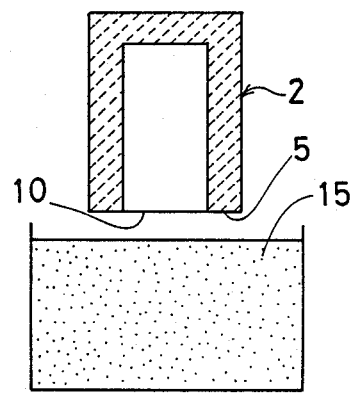
FIGS. 10 to 15 illustrate respective steps included in another embodiment of a method according to the present invention in sequence.
Figure 11:
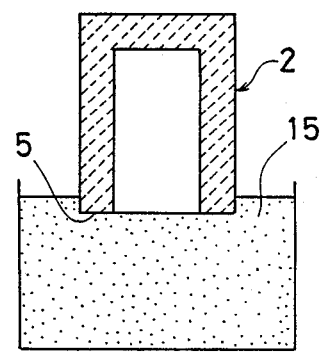
Figure 12:
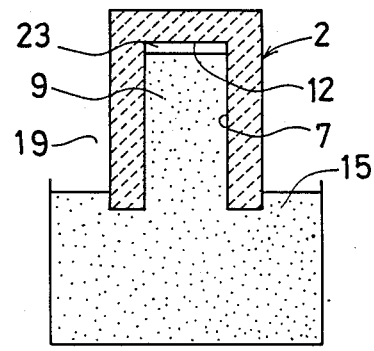

The steps shown in FIG. 10, 11 and 12 correspond to those shown in FIGS. 1, 2 and 3 respectively. Therefore, these steps is will not be described again.

In a step as shown in FIG. 12, air 23 remains between the surface of the metal paste 15 located in the inner space 9 of the ceramic body 2 and the bottom surface 12 of the ceramic body 2. The volume of the air 23 is determined by the difference between the pressure applied to the treatment vessel in the step of FIG. 10 and the pressure applied to the outer space 19 in the step of FIG. 12.

Figure 13:
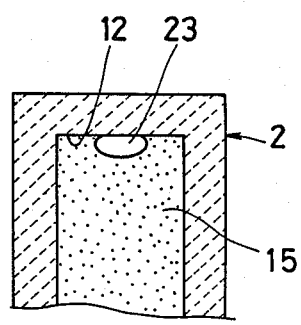

In the step of FIG. 12, the outer space 19 is restored to the atmospheric pressure, and then a pressure of 1000 to 5000 mmHg, preferably of about 2000 mmHg, is further applied to the outer space 19. Thus, as shown in FIG. 13, the metal paste 15 is further upwardly urged to be in contact with the bottom surface 12 of the ceramic body 2 although the air 23 remains, in the form of a flat bubble. When such a pressurizing state is retained for about 5 to 30 seconds, as shown in FIG. 14, the metal paste 15 will displace the air 23 and thus will be entirely in contact with the bottom surface 12, due to the wettability of the metal paste 15 with respect to the ceramic body 2.

Then the treatment vessel is decompressed as shown in FIG. 15, so that the metal paste 15 filling up the inner space 9 of the ceramic body 2 is discharged from the inner space 9. The level of this decompression is preferably identical to or lower by about 10 mmHg than that in the step of FIG. 10. Thus, a metal paste film 21a for serving as the inner electrode 3a (FIG. 16) is formed on the inner peripheral surface 7 and the bottom surface 12 of the ceramic body 2.

Then, steps substantially identical to those shown in FIGS. 5 to 8 are performed. Thereafter the metal paste films 21a and 22 (FIG. 8) are baked to obtain the cylindrical capacitor 1a as shown in FIG. 16.

FIGS. 17 to 25 illustrate respective steps included in still another embodiment of a method according to the present invention in sequence, and FIG. 26 is a sectional view showing the cylindrical capacitor 1b obtained through the steps as shown in FIGS. 17 to 25. As mentioned above, the cylindrical capacitor 1b is different from the cylindrical capacitors 1 and 1b in that the openings 10b and 13 communicating with the inner space 9b are formed in both of the first and second end surfaces 5b and 6b of the ceramic body 2b.

Figure 17:
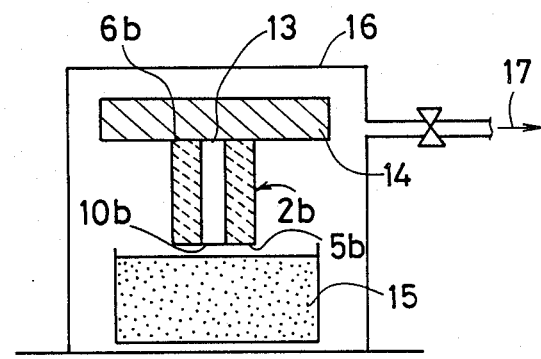
Figure 18:
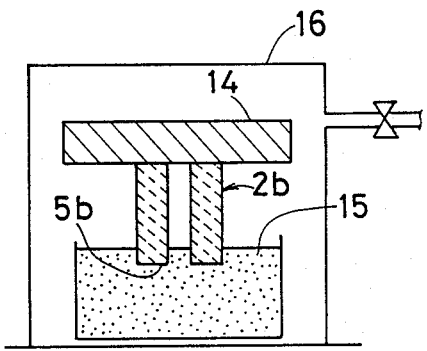
Figure 19:
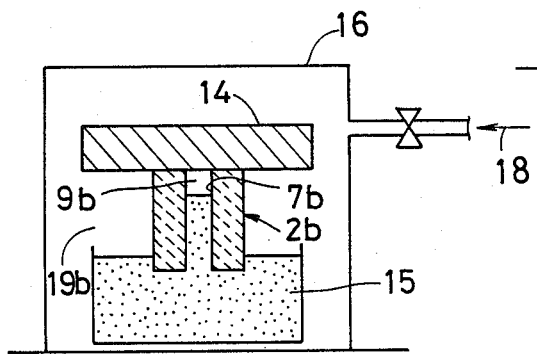
Figure 20:
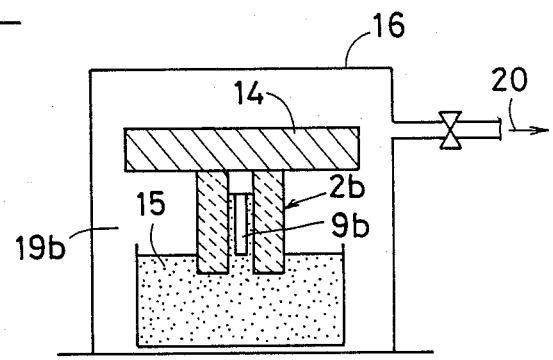

First, the ceramic body 2b is held by a holding plate 14 by the second end surface 6b so that the first end surface 5b is downwardly directed, as shown in FIG. 17. In this embodiment, it is important that the holding plate 14 is also adapted to seal the second opening 13 of the ceramic body 2b. Thereafter pressure regulation and vertical movement of the ceramic body 2b are performed in a treatment vessel 16 in respective steps as shown in FIGS. 17 to 21. These steps are substantially identical to those as shown in FIGS. 1 to 5 and as described hereinabove.

Figure 21:
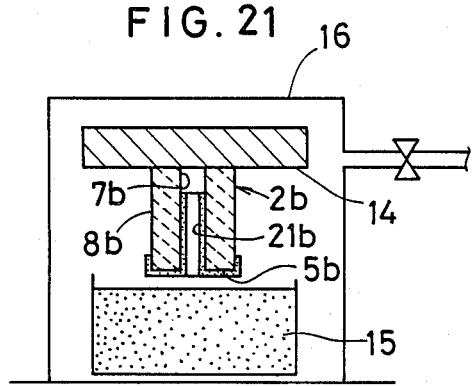
Figure 22:
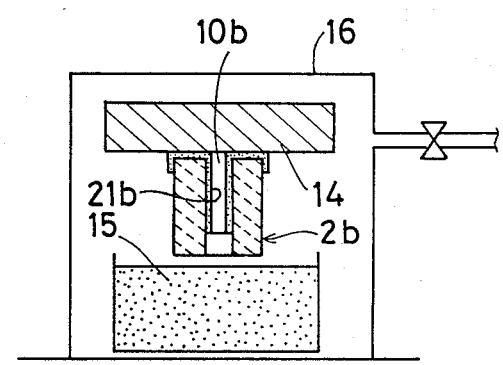

Upon completion of the step as shown in FIG. 21, a metal paste film 21b is formed and serially extends from the inner peripheral surface 7b of the ceramic body 2b to the outer peripheral surface 8b, across the first end surface 5b. After the metal paste film 21b is dried, the ceramic body 2b is again held by the holding plate 14 this time in a vertically inverted manner as shown in FIG. 22. In this state, the opening 10b of the ceramic body 2b is sealed by the holding plate 14.

Figure 23:
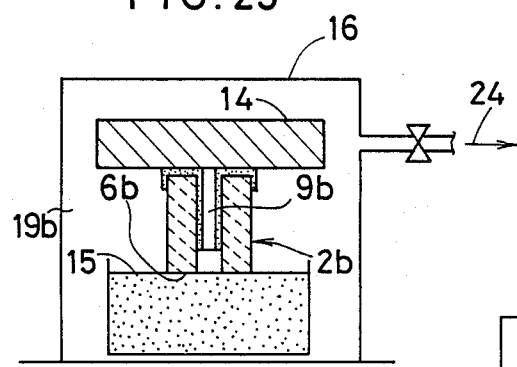

Then, as shown in FIG. 23, the second end surface 6b of the ceramic body 2b is brought into contact with the surface of the bath of the metal paste 15. Thereafter the treatment vessel 16 is evacuated as shown by an arrow 24, and thereby compressed to a prescribed pressure level. Thus, the pressure in the outer space 19b of the ceramic body 2b is lower than that in the inner space 9b thereof.

Figure 24:
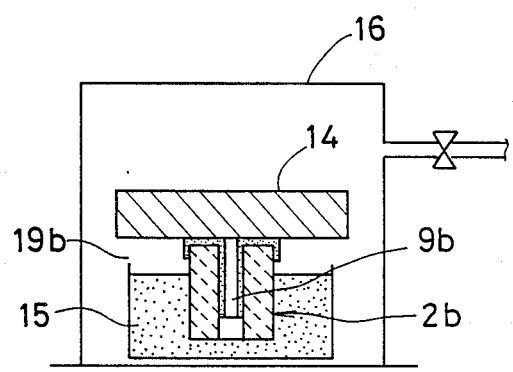

Then the ceramic body 2b is dipped into the bath of the metal paste 15 as shown in FIG. 24 while maintaining the aforementioned pressure difference. The depth of the dipping may be decided in response to the required size of the outer electrode 4b (FIG. 26). In the step as shown in FIG. 24, the metal paste 15 is prevented from entering the inner space 9b since the pressure in the inner space 9b is higher than that in the outer space 19b.

Then, the ceramic body 2b is lifted up from the bath of the metal paste 15 as shown in FIG. 25, whereby a metal paste film 22b is formed over the outer peripheral surface 8b and the second end surface 6b of the ceramic body 2b.

Thereafter the metal paste films 21b and 22b are so baked as to obtain the cylindrical capacitor 1b provided with the inner electrode 3b and the outer electrode 4b as shown in FIG. 26.

In the method of forming the metal paste film 22b for serving as the outer electrode 4b in the aforementioned embodiment, the vertical dimension of the metal paste film 22b in FIG. 25 is determined by the depth to which the ceramic body 2b is dipped in the step shown in FIG. 24, the upper edge of the metal paste film 22b in FIG. 25 being formed by the surface of the bath of the metal paste 15, whereby a clear clearance can be defined between the inner electrode 3b and the outer electrode 4b in the cylindrical capacitor 1b.

Although the metal paste film 22 or 22b, serving as the outer electrode 4 or 4b, is formed in these embodiments by the dipping method as shown in FIGS. 6 to 8 or 22 to 25, such a metal paste film 22 or 22b may also be formed by a coating method employing a brush, a knife, a transfer roller or the like. FIG. 27 illustrates a method of forming a metal paste film by means of a transfer roller and FIG. 28 is a sectional view showing the cylindrical capacitor 1c obtained through the step of FIG. 27.

Referring to FIG. 27, the ceramic body 2b, which is obtained through the step of FIG. 21, is already provided with a metal paste film 21b to serve as the inner electrode 3b (FIG. 28). As shown in FIG. 27, a transfer roller 25 whose outer peripheral surface is coated with metal paste 15 is applied to the ceramic body 2b, in order to transfer the metal paste 15 to a prescribed region of the outer peripheral surface 8b of the ceramic body 2b. Thus, a metal paste film 22c for serving as the outer electrode 4c (FIG. 28) is formed on the outer peripheral surface 8b of the ceramic body 2b. Although no metal paste film is formed on the second end surface 6b of the ceramic body 2b in this method, a metal paste film may be formed to extend over the second end surface 6b by auxiliarily utilizing a brush, knife or the like if needed.

The metal paste film 22c obtained through the step as shown in FIG. 27 is baked with the metal paste film 21b, to obtain the cylindrical capacitor 1c provided with the inner electrode 3b and the outer electrode 4c as shown in FIG. 28.

The pressure regulation in the treatment vessel 16 was performed by decompressing the same to a pressure level lower than the atmospheric pressure and then restoring the same to the atmospheric pressure, to cause a pressure difference between the inner space 9 or 9b and the outer space 19 or 19b of the ceramic body 2 or 2b, in the steps shown in FIGS. 1 to 3, 10 to 12 or 17 to 19. However, pressure difference may be alternatively caused by the following method: With reference to FIGS. 1 to 3, for example, the treatment vessel 16 may be brought to the atmospheric pressure level in the step of FIG. 1, then a pressure higher than the atmospheric pressure is applied to the treatment vessel 16, while the opening 10 of the ceramic body 2 is closed by the metal paste 15 as shown in FIG. 2, so that the metal paste 15 is upwardly urged into the inner space 9 of the ceramic body 2 as shown in FIG. 3. Also in this case, the area of the metal paste film 21 can be adjusted by the degree of pressurization, while the steps as shown in FIGS. 13 and 14 can be similarly performed by maintaining this state for a prescribed period while increasing the degree of pressurization.

Although the present invention has been described and illustrated in detail, it is clearly understood that the same is by way of illustration and example only and is not to be taken by way of limitation, the scope of the present invention being limited only by the terms of the appended claims.

What is claimed is:

1. A method of manufacturing a cylindrical capacitor comprising a cylindrical ceramic body having opposite first and second end surfaces at first and second ends of said body, an inner peripheral surface and an outer peripheral surface extending between said first and second end surfaces, an opening in said first end surface communicating with an inner space enclosed by said inner peripheral surface, and an inner electrode and an outer electrode formed on said inner peripheral surface and said outer peripheral surface respectively to be opposite to each other and separated by said ceramic body, thereby providing a selected capacitance, said method comprising the steps of:
   (a) preparing said cylindrical ceramic body;
   (b) preparing a bath of metal paste containing metal for forming said inner electrode;
   (c) closing said opening with said metal paste by bringing said first end surface of said ceramic body at least into contact with the surface of said metal paste bath;
   (d) after closing said opening with said metal paste, then causing an air pressure difference such that the air pressure in said inner space of said ceramic body, whose opening is closed by means of said metal paste, is lower than the air pressure in an outer space defined to be outside the exterior of said outer peripheral surface of said ceramic body;
   (e) making a portion of the surface of said metal paste bath located in said inner space higher than a portion of said surface of said metal paste bath located in said outer space, in response to said pressure difference, and selectively adjusting said pressure difference, thereby to selectively bring said metal paste into contact with a selected substantial portion of said inner peripheral surface; and
   (f) then cancelling said pressure difference and thereby forming a film of said metal paste to serve as said inner electrode in said selected substantial portion of said inner peripheral surface.

2. A method in accordance with claim 1, wherein said step of causing said pressure difference includes a step of placing the entire said ceramic body under a first air pressure in advance of said step of closing said opening, and a step of applying a second air pressure which is higher than said first air pressure to said outer space subsequently to said step of closing said opening.

3. A method in accordance with claim 2, wherein said first air pressure is atmospheric pressure and said second air pressure is pressure higher than atmospheric pressure.

4. A method in accordance with claim 2, wherein said first air pressure is a pressure lower than atmospheric pressure and said second air pressure is atmospheric pressure.

5. A method in accordance with claim 2, wherein said step of causing said pressure difference further includes a step of applying a third air pressure which is higher than said second air pressure to said outer space subsequently to said step of applying said second air pressure.

6. A method in accordance with claim 1, wherein said ceramic body has a configuration closed at said second end surface.

7. A method in accordance with claim 1, wherein said ceramic body has a second opening communicating with said inner space at said second end surface, said second opening being sealed during said step of causing said pressure difference.

8. A method in accordance with claim 1, wherein said metal paste is brought into contact with said first end surface and with a part of said outer peripheral surface adjacent to said first end surface, whereby said film of said metal paste extends continuously from said inner peripheral surface to said part of said outer peripheral surface, and across said first end surface.

9. A method in accordance with claim 1, wherein the vertical position of the surface of said metal paste located in said inner space is controlled by regulating the value of said pressure difference in said step of bringing said metal paste into contact with a selected substantial portion of said inner peripheral surface.

10. A method in accordance with claim 6, wherein a portion of said inner peripheral surface of said body at said second end of said inner space is part of said selected substantial portion of said inner peripheral surface where said film is formed.

11. A method in accordance with claim 1, wherein said substantial selected portion of said inner peripheral surface, on which said inner electrode is formed, is selected to provide said inner electrode with a surface area which forms a predetermined capacitance with said outer electrode.

12. A method in accordance with claim 1, wherein said ceramic body is adhered to a holding plate for holding and moving the same, at least during said steps (c)–(f).

13. A method in accordance with claim 7, wherein said ceramic body is adhered to a holding plate for holding and moving the same, at least during said steps (c)–(f), by an adhesive material on said holding plate which seals said second opening during said step of causing said pressure difference.

14. A method of manufacturing a plurality of cylindrical capacitors, each comprising a cylindrical ceramic body having opposite first and second end surfaces, an inner peripheral surface and an outer peripheral surface extending between said first and second end surfaces, an opening in said first end surface communicating with an inner space enclosed by said inner peripheral surface, and in inner electrode and an outer electrode formed on said inner peripheral surface and said outer peripheral surface respectively to be opposite to each other and separated by said ceramic body, thereby providing a selected capacitance, said method comprising the steps of:
 (a) preparing said cylindrical ceramic bodies;
 (b) preparing a bath of metal paste containing metal for forming said inner electrode;
 (c) closing said openings with said metal paste by bringing said first end surfaces of said ceramic bodies at least into contact with the surface of said metal paste bath;
 (d) after closing said openings with said metal paste, then causing an air pressure difference such that the air pressure in said inner spaces of said ceramic bodies, whose openings are closed by means of said metal paste, is lower than the air pressure in an outer space defined to be outside the exteriors of said outer peripheral surfaces of said ceramic bodies;
 (e) making a portion of the surface of said metal paste bath located in each said inner space higher than a portion of said surface of said metal paste bath located in said outer space, in response to said pressure difference, and selectively adjusting said pressure difference, thereby to selectively bring said metal paste into contact with selected substantial portion of said inner peripheral surfaces; and
 (f) then cancelling said pressure difference and thereby forming films of said metal paste to serve as said inner electrodes in said selected substantial portions of said inner peripheral surfaces.

15. A method in accordance with claim 14, wherein said ceramic bodies are adhered to a common holding plate at least during said steps (c)–(f).

16. A method in accordance with claim 15, wherein said ceramic body has a configuration closed at said second end surface.

17. A method in accordance with claim 15, wherein each said ceramic body has a second opening communicating with said inner space at said second end surface, said second opening being sealed during said step of causing said pressure difference.

18. A method in accordance with claim 17, wherein each said ceramic body is adhered to a holding plate at least during said steps (c)–(f), by an adhesive material on said holding plate which seals said second opening during said step of causing said pressure difference.

* * * * *